J. TILTON.
Preserving Meat.
No. 58,511. Patented Oct. 2, 1866.
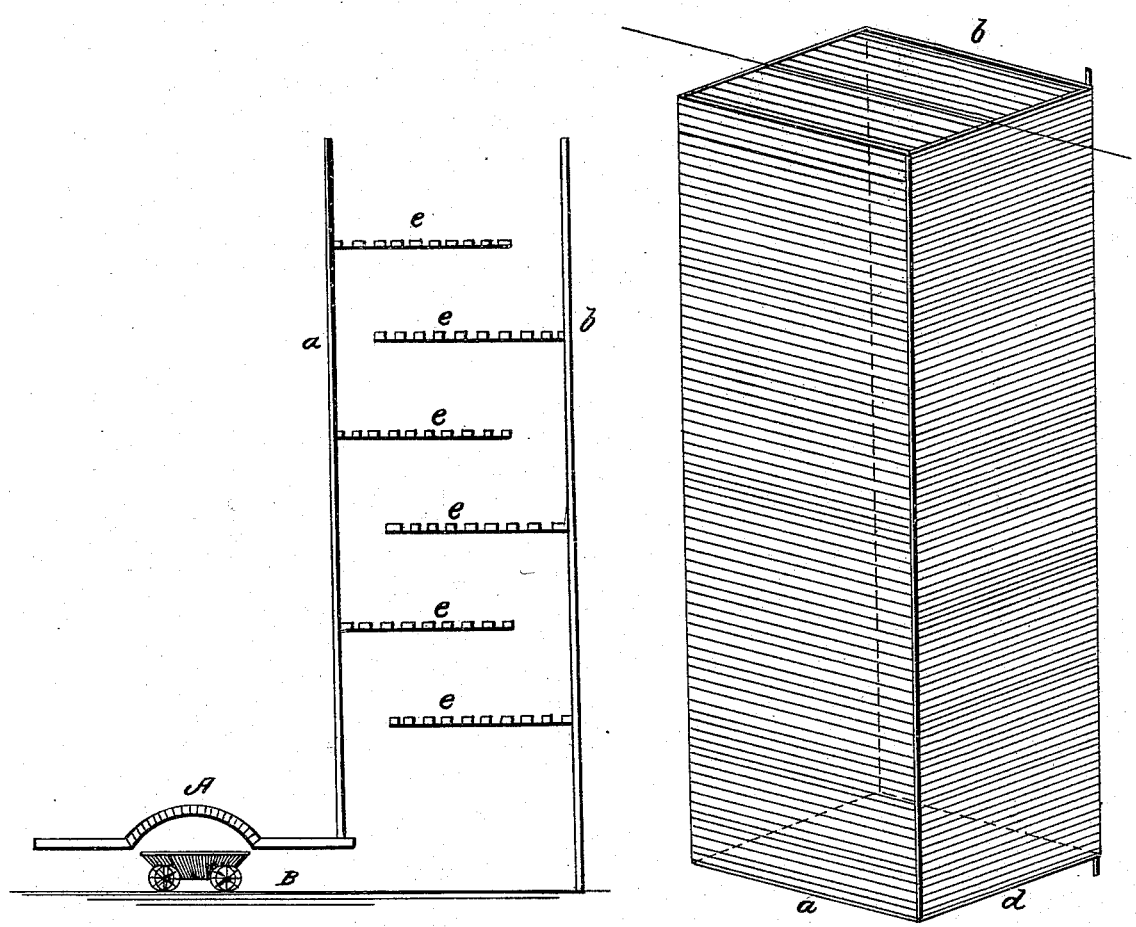

UNITED STATES PATENT OFFICE.

JOHN TILTON, OF NEW YORK, N. Y.

IMPROVED METHOD OF PRESERVING AND CURING MEAT.

Specification forming part of Letters Patent No. 58,511, dated October 2, 1866.

*To all whom it may concern:*

Be it known that I, JOHN TILTON, of the city, county, and State of New York, have invented or discovered certain new and useful Devices for Curing Meats, not hitherto used or known; and I do hereby declare that the following is a full and sufficient description thereof, reference being had to the drawings and references thereon.

Meats have been cured in a variety of ways. Some use drying, others smoking; some pack in sugar, others in oil, others in a vacuum. Some cure meats on the bone, others cut it from the bone and put it into molds or forms for the market.

I propose to chip the meat from the bones in small pieces, and mix them with the proper seasoning, (after the meats, fat and lean, are suitably intermixed and pressed so as to exclude all water therefrom,) and then place them on open-work shelves, as wire-cloth, or place the meat in suitable canvas bags suspended in the smoke-room, or on the shelves, as shown in the drawings.

The value of the shelf arrangement is that of detaining the smoke for a longer time in the smoke-room, and at the same time spread the meat on the shelves in such manner that every part of its surface is exposed to the full force and action of the smoke. The meat once chipped from the bones has its pores open to the absorptive powers of the smoke far beyond all possibility when the meat is fast on the bones.

Again, in my process I expose always masses of a uniform size and thickness, so that when one mass, shelf, or package is penetrated to its center by the smoke, 1 shall know certainly that all are in the same state, for all are of the same size, shape, and thickness.

While I season the meats somewhat in the same way that others do in curing them, I do not claim novelty on the score of seasoning with pepper, or salt, or saltpeter, or sugar, or vinegar or oil.

The gist of my invention rests on two distinct devices. One is dividing the meat into small fragments, so that the smoke can easily and certainly penetrate the mass on the shelves, or their equivalent, where every piece or parcel, being of uniform size, must have the same amount of curing agency; secondly, I expel all the water before seasoning and smoking, which moisture greatly interferes with the preserving power of the smoking.

I am enabled to cure by my process bacon and hams in a much shorter time than it can be done by any other known method.

I first cut the meat from the bone in any suitable way, and expose it in a suitable press to expel all the water therefrom. I then transfer the meat to the action of a suitable chopping-machine, in which I mix with the mass the amount of materials designed to be used as curing ingredients, which are duly commingled in the act of chopping. There is no waste material, as I work up all of the small pieces, and equally distribute fat and lean, and present a uniform and good composition.

The work is performed as follows: Taking pork as an example, hams, shoulders, and loins, or the cuttings thereof, are first divested of their bones and water, and then put into a suitable chopping-machine with the curing composition, and mixed and cut to the proper degree of fineness and uniformity, when the material is ready to be transferred to the shelves of the smoke-room, either loose or in bags of canvas, as I may elect. In warm weather I generally prefer the canvas bags. In cold weather the meat can be spread loose when preferred.

The proportions used are: One hundred pounds meat, one-fourth pound saltpeter, two pounds common salt, one and one-half pound sugar, one ounce of Cayenne pepper. These materials, in the process of cutting, are thoroughly mixed, and every part of the same is perfectly penetrated by the curing materials. The next step is the smoking operation.

In the drawings, Figure 1 represents view of the smoke-room. Fig. 2 is a sectional view, door *d* removed.

A represents the furnace for working the fuel on its hearth B, or on a small traveling car of iron, which may be substituted. *e* represents the shelves of wire-cloth, which may be hinged on the sides *a* and *b* to drop into the vertical position, and may be supported by braces, if desired, but not shown in the drawings.

To use this apparatus, the apartment represented in Fig. 1 may be of mason-work or of iron, and such form and size as will be adapted to the work to be done, whether one or many, large or small. The shelves may be of wire-cloth or perforate sheet-iron, or any open-work of metal. The leading feature of the invention is to bring the smoke into contact with the upper and lower surface of the meat simultaneously, and to make an even thickness of meat on all the shelves, by which means the charge is equally cured in every part of the mass, whether the meat be spread loose on the shelves or put into canvas, as before stated. If put into canvas the bags may be suspended on hooks in place of laying them on shelves.

Having described the nature of the invention and the modes of using the same, what I claim as my invention, and desire to secure by Letters Patent, is—

Curing meats by first cutting them from the bone, then expelling the water by pressure, then mixing the curing composition, and smoking loose on shelves or in the canvas bags, substantially as set forth.

JOHN TILTON.

Witnesses:
G. W. BENSON,
L. D. GALE.